W. R. BUTNER.
MILK PAIL COVER.
APPLICATION FILED JULY 26, 1911.
1,009,646.
Patented Nov. 21, 1911.
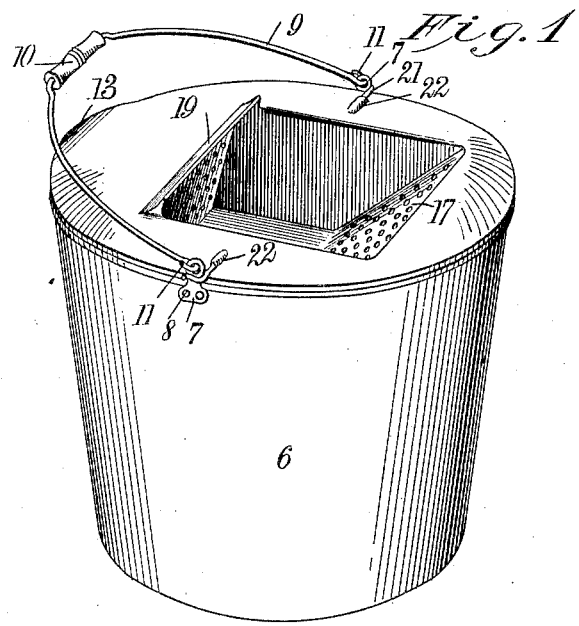
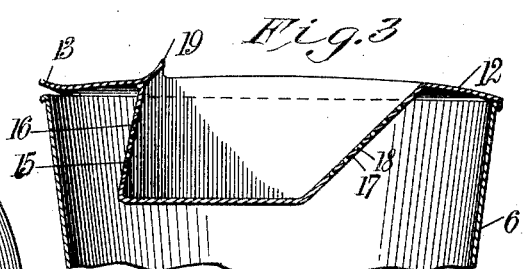
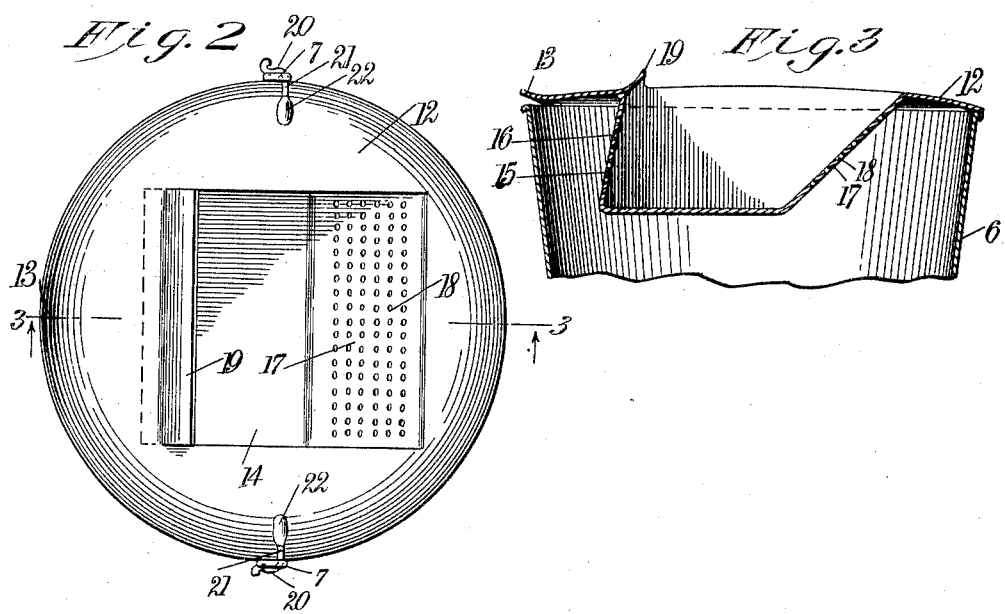
WITNESSES
F. C. Alexander
Walton Harrison
INVENTOR
William R. Butner
BY Munn & Co.
ATTORNEYS

UNITED STATES PATENT OFFICE.

WILLIAM R. BUTNER, OF TOPAZ, CALIFORNIA.

MILK-PAIL COVER.

1,009,646.

Specification of Letters Patent.

Patented Nov. 21, 1911.

Application filed July 26, 1911. Serial No. 640,645.

*To all whom it may concern:*

Be it known that I, WILLIAM R. BUTNER, a citizen of the United States, and a resident of Topaz, in the county of Mono and State of California, have invented a new and Improved Milk-Pail Cover, of which the following is a full, clear, and exact description.

My invention relates to milk pail covers, my more particular purpose being to produce an improved cover possessing peculiar advantages, and adapted for use in connection with ordinary standard milk pails.

Reference is to be had to the accompanying drawing forming a part of this specification in which like characters of reference indicate corresponding parts in all the views, and in which—

Figure 1 is a perspective view showing my improved milk pail cover as applied to a pail; Fig. 2 is a plan view of the mechanism shown in Fig. 1; and Fig. 3 is a fragmentary section on the line 3—3 of Fig. 2, looking in the direction of the arrow.

The pail is shown at 6 and is provided with ears 7 each ear being secured in place by rivets 8. A bail 9 is provided with a handle 10 and with up-turned portions 11 engaging the ears which extend slightly above the top of the pail.

The milk pail cover is shown at 12 and has a general convex form, as indicated in Fig. 3. This cover is provided with a lip 13 turned slightly upward and is further provided with a cup 14, this cup having a front wall 15; that is, the wall disposed nearest the up-turned portion 13 of the cover, is inclined slightly, as indicated in Fig. 3, in order to facilitate pouring milk out of the pail, the bottom of the wall 15 being near the adjacent surface of the pail body so that the cup is somewhat distorted from a symmetrical form, as indicated in Fig. 3. The front wall 15 of the cup is provided with holes 16, the rear wall 17 of the cup being similarly provided with holes 18. The cup extends downwardly through a large central opening in the cover. The holes 16, 18 are arranged in horizontal rows, the lowermost of which are spaced a little above the bottom of the cup.

The cover 12 is provided with a lip 19 which slightly overhangs the wall 15, and is curved slightly upward or outward, as indicated in Fig. 3. The purpose of this lip is to retain the foam, when the pail is tilted in order to pour out the milk. The cover 12 is further provided with hooks 20 disposed oppositely to each other, each hook 20 being bent into proper form to engage one of the ears 7. The two hooks 20 are mounted upon and integral with wire members 21, each wire member being secured by a solder connection 22 to the pail cover. Whenever the cover is placed in its normal position on the pail body as indicated, the hooks 20 are pressed firmly against the ears 7, very effectively holding the cover in position. On this account I conveniently designate the hooks 20 as "gripping" hooks.

The inclination of the rear wall 17 of the cup is considerably greater than that of the front wall 15. The purpose of this arrangement is to enable the cover 12 to be lifted away from the pail body without danger of the cup catching upon the upper surface of the pail body. The considerable slant given to the wall 17 facilitates this purpose. The operator by grasping the cover can lift it almost directly away from the pail with little or no precaution to raise it first vertically upward. This shape of the cup also facilitates the replacement of the cover and practically enables it to be thrust back into position. The upper edge of the pail body serves as a guide for the cover 12, and consequently guides the hooks 20 into proper position so that they engage the ears 7.

The operation of my device is as follows: The cover 12 is placed in position as above described, the hooks 20 being properly guided to engage the respective outer surfaces of the ears 7, and by pressing against these ears, very effectively hold the cover in position. The milking is now accomplished, and a little milk accumulates in the cup. As soon, however, as the milk reaches the lowermost row of holes 16, 18, the milk is drained off practically from its upper surface, and thus trickles or drops into the pail body, gradually filling the latter. Any dirt which happens to find lodgment in the cup cannot readily find its way into the pail, being retained in the cup by virtue of the fact that it cannot readily pass through the holes. Moreover, if the dirt happens to be of the kind which readily sinks into the milk, it will drop into the bottom of the cup and there remain. When the milking is finished, a little milk will remain in the bottom of the cup, and even this may be saved. For this purpose the cover is disengaged and lifted gradually to different angles. The milk is thus drained out of the cup and the dirt retained therein. A little practice enables this to be done to perfection. The dirt being thus separated and left within the cup may, of course, be readily thrown out. In order to disengage the cover, it is simply grasped by the hands and moved to the right, according to Figs. 2 and 3, being at the same time slightly lifted and thus carried obliquely upward so that the bottom of the cup misses the adjacent upper edge of the pail body.

I do not limit myself to any particular materials to be used in the construction of the pail, or any part thereof. However, it may be desirable to make the cover of metal and of proper proportions to fit the standard pail.

Having thus described by invention, what I claim as new and desire to secure by Letters Patent is:—

1. In a milk pail cover, the combination of a milk cover member provided with an opening and with a cup extending from said opening, said cover being convex and provided with a lip portion overhanging one edge of said cup, said cover member being provided with means for holding it upon a pail body.

2. The combination of a pail body provided with ears, a bail provided with portions extending through said ears, a cover for said pail body, said cover being provided with hooks for engaging said ears in order to hold said cover upon said pail body, and a cup mounted upon said cover and depending below said opening, said cup having a wall inclined in the proximate direction in which said hooks extend to prevent said cup from engaging said pail body when said cover is lifted upwardly therefrom at an angle.

In testimony whereof I have signed my name to this specification in the presence of two subscribing witnesses.

WILLIAM R. BUTNER.

Witnesses:
T. E. RUTTER,
W. J. RADLEY.

---

Copies of this patent may be obtained for five cents each, by addressing the "Commissioner of Patents, Washington, D. C."